United States Patent

Timmons

[11] 3,881,269
[45] May 6, 1975

[54] AUTOMATIC FISHING DEVICE

[75] Inventor: James Edward Timmons, Newark, Calif.

[73] Assignee: John Nicolls, Fremont, Calif.

[22] Filed: Aug. 16, 1974

[21] Appl. No.: 497,837

[52] U.S. Cl. .......................... 43/15; 43/16; 43/21.2; 248/42
[51] Int. Cl. ............................................ A01k 97/10
[58] Field of Search ............ 43/15, 21.2, 16; 248/42

[56] References Cited
UNITED STATES PATENTS

| | | | |
|---|---|---|---|
| 2,783,575 | 3/1957 | Housel | 43/16 |
| 2,804,277 | 8/1957 | Kinder | 248/42 |
| 3,834,055 | 9/1974 | Bianco | 43/15 |

Primary Examiner—Louis G. Mancene
Assistant Examiner—Peter K. Skiff
Attorney, Agent, or Firm—Schatzel & Hamrick

[57] ABSTRACT

A fishing device is disclosed for automatically setting the hook in a fish after the fish takes the bait. The fishing device comprises a base on which is mounted a pivotal receiving tube, an adjustable spring mount and a trigger mount. The receiving tube is adapted to receive a handle of a fishing rod or pole. A spring is connected between the receiving tube and the adjustable spring mount. The trigger mount is adapted to connect to the receiving tube so as to hold the receiving tube in a "loaded" position against the tension of the spring. The adjustable spring mount is adapted to allow for adjustment of the spring tension on the receiving tube in the loaded position. In operation, and with the fishing device in the loaded position, when a fish takes the bait with a force sufficient to move the pole and receiving tube forward against the spring, the trigger mount will disengage. Disengagement of the mount allows the spring tension to act on the receiving tube in a backward direction so as to cause the fishing pole to be pulled backward against the pull by the fish, thereby setting the hook in the fish.

11 Claims, 8 Drawing Figures

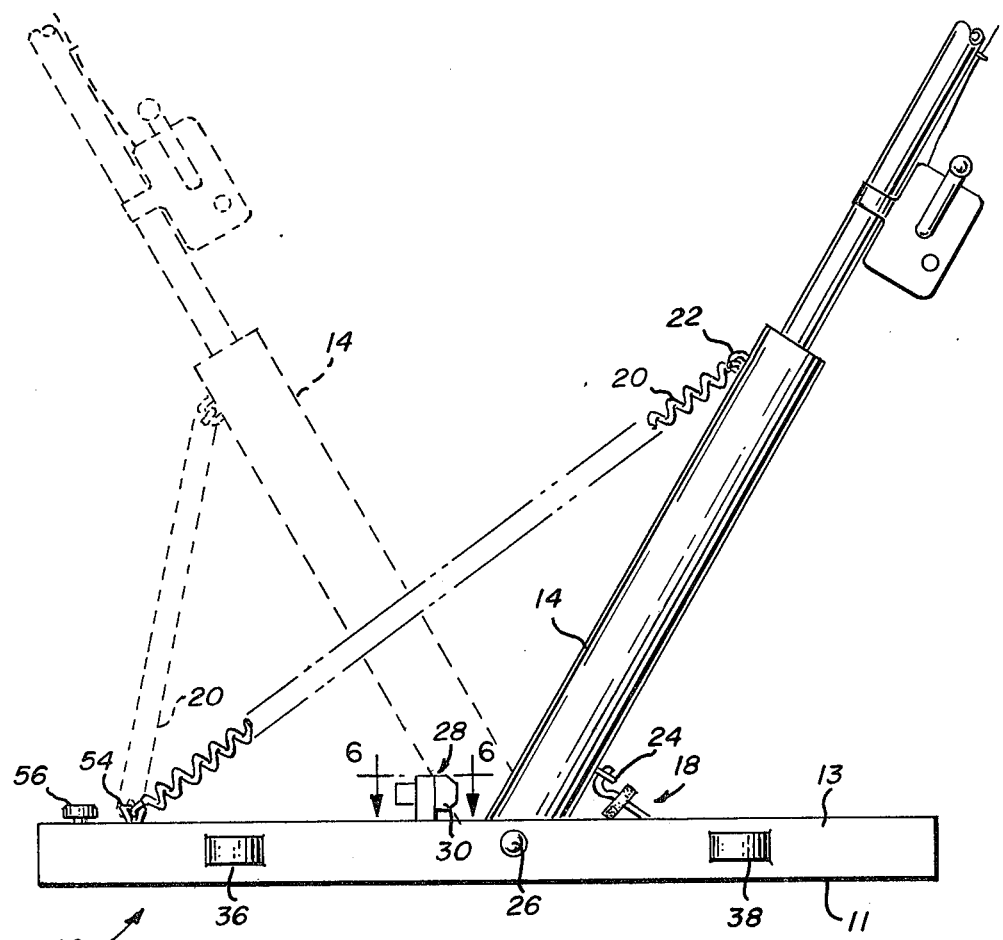
Fig_1
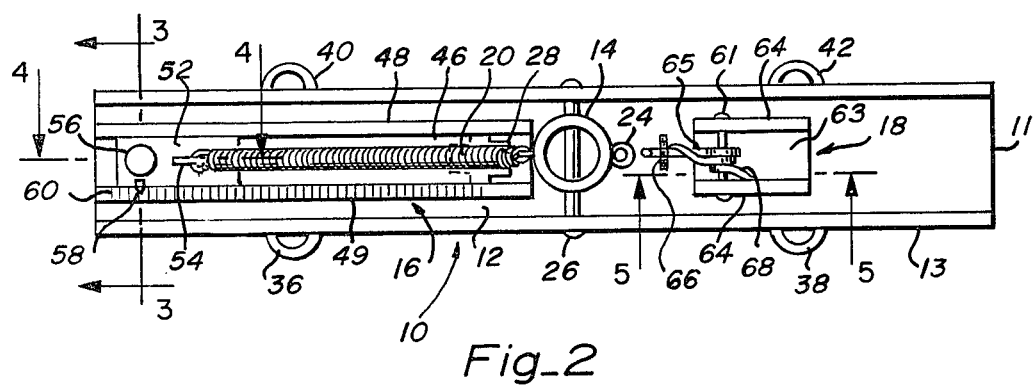
Fig_2

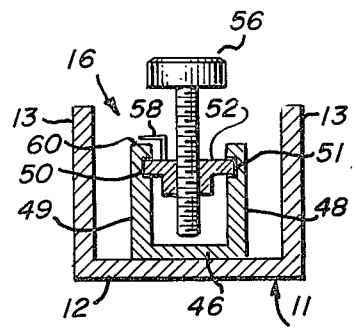
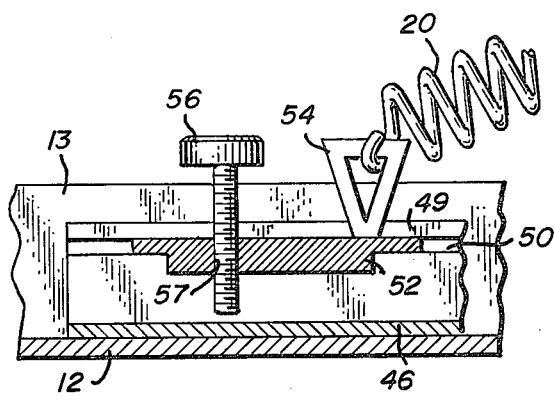
Fig_3  Fig_4
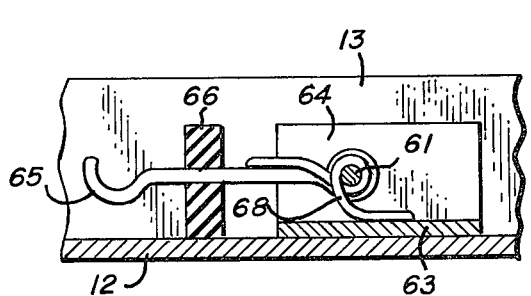
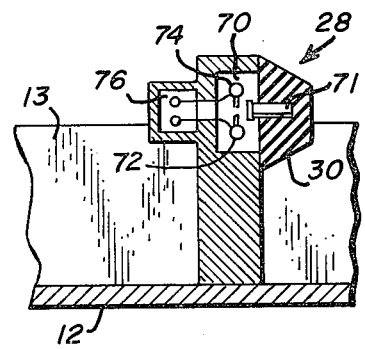
Fig_5  Fig_6
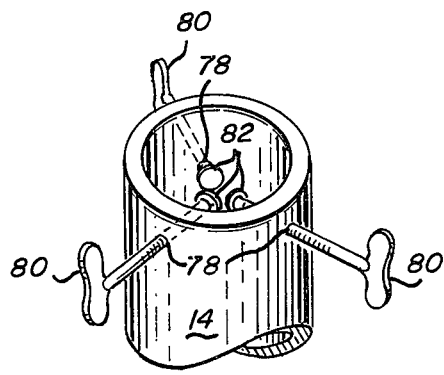
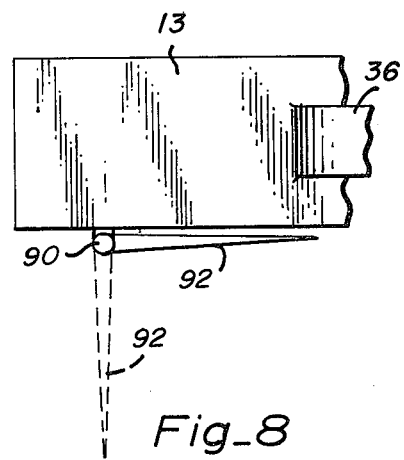
Fig_7  Fig_8

AUTOMATIC FISHING DEVICE

BACKGROUND OF THE INVENTION

1. Field of the Invention

This invention relates to automatic fishing devices and refers more particularly to devices for supporting individual fishing rods or poles which operate to instantaneously snap the rod when a fish takes the bait and exerts a pull on the line thereby setting the hook in the fish.

2. Description of the Prior Art

The prior art, to the extent known to the inventor, includes structures disclosed in the following patents. U.S. Pat. No. 3,898,697, entitled "Automatic Fishing Rod and Pole Holder," describes an automatic fishing device adapted to hold a fishing rod so that when a fish strikes the line, the device will automatically actuate to snag or catch the fish. This device is comprised of a base having a receiving tube pivotally mounted thereto. A spring is connected between the receiving tube and the main body of the device. A pivotable loading arm is connected to the base and engages the receiving tube so as to hold the receiving tube in a loaded position against the tension of the spring. The pivotable arm includes a plurality of settings by which the spring tension acting against the pivotable arm for loading the device can be adjusted. When a fish strikes the line of a fishing rod inserted within the receiving tube, the receiving tube will be pulled forward and downward causing the pivotable loading arm to disengage the receiving tube and to fall away due to the effects of gravity. The spring exerts a force on the end of the receiving tube causing the receiving tube and fishing rod inserted therein to be pulled in a backward direction thereby hooking the fish.

U.S. Pat. No. 2,918,746 entitled "Automatic Fishing Device" describes an apparatus adapted to support a fishing rod and to automatically elevate the forward end of the fishing rod in response to a pull applied to the fishing line associated with the rod. This device is comprised of a base having a pivotable mounting arm connected thereto. The fishing rod is connected to the pivotable mounting arm. A spring is connected between the end of the pivotable mounting arm and the base of the device. A pivotable loading arm is mounted to the pivotable holding arm and engages the base of the device. A triggering device is pivotably mounted to the base and the fishing line of the fishing rod mounted to the pivotable holding arm. When a fish pulls on the line of the fishing rod, the trigger arm will release the pivotable loading arm from the body causing the spring to pull downward on the pivotable mounting arm causing the arm and rod attached thereto to be pulled in an upward direction.

U.S. Pat. No. 3,016,648 entitled "Mechanical Fishing Device" describes an automatic fish catching device wherein a pull on the line triggers the device so as to hook the fish. The sensitivity of the trigger device is variable to permit adjustment of the device to the fishing characteristic being encountered. This device comprises a base having a pivotable mounting arm connected thereto for receiving a fishing rod. A spring is connected between the end of the pivotable mounted arm and the base. A trigger pivoting arm is pivoted on the base and engages the fishing pole mounted within the mounting arm and the mounting arm itself. An adjustment is provided to determine the amount of deflection of the fishing rod necessary to release the pivotable trigger arm from engagement with the mounting arm. In operation, when a force is applied to the fishing rod by a fish, the fishing rod will be pulled downward thereby disengaging the pivotable trigger arm from the pivotable mounting arm, allowing the spring to draw the pivotable mounting arm, allowing the spring to draw the pivotable arm and the fishing rod attached thereto in a backward direction, thereby hooking the fish.

U.S. Pat. No. 3,205,606 entitled "Fishing Apparatus" describes an apparatus for holding a fishing rod and for moving that fishing rod and line to hook a fish in response to a bite on the line of the fishing rod. This device has a base with a pivotable receiving tube mounted thereto. A spring is connected between the end of the receiving tube and the base. A pivotable trigger arm is mounted to the base and engages the receiving tube. The receiving tube has an adjustable member for receiving the trigger arm so as to determine the amount of deflection of the receiving tube necessary to disengage the receiving tube from the trigger arm. A second triggering device is provided which engages the fishing line such that upon a predetermined tension of the fishing line, the pivotable trigger arm will be moved so as to be disengaged from the receiving tube allowing the actuation of the device. This device is sensitive to both deflection of the receiving tube and the line tension on the line of the fishing rod mounted within the tube.

However, all of the prior art devices have a problem in that none are able to control the tension of the spring.

BRIEF SUMMARY OF THE INVENTION

Accordingly, it is an object of the present invention to provide an improved automatic fishing device having means to control the tension of the spring, thereby controlling the force and speed in which the rod is moved backward after the bait is taken by a fish.

Another object of the present invention is to provide an improved automatic fishing device which includes a simple means for adjusting the sensitivity of the device.

Another object of the invention is to provide an improved automatic fishing device which can be easily mounted on a rigid structure such as the side of a boat.

A further object of the invention is to provide an automatic fishing device which may be used for trolling from a boat.

A further object of the invention is to provide an automatic fishing device which may be securely held to the ground such that the apparatus can be used from the banks along a river or lake, or along the seashore.

Another object of the invention is to provide an improved automatic fishing device having a warning apparatus which is triggered when a fish is hooked so as to provide a signal to notify the fisherman that the device has been actuated.

Briefly, the automatic fishing device of the invention comprises a base having a pivotal receiving tube mounted thereto. The receiving tube is adapted to receive the handle of a fishing rod or pole. A spring is connected between the receiving end of the receiving tube into an adjustable spring mount which is mounted to a carriage which is slidably mounted relative to the base. A carriage locking means is engaged to the carriage for locking the carriage at any desired position along the adjustable spring mount. The adjustment of the carriage position allows the tension of the spring to be controlled when the fishing device is in a "loaded position." The spring tension in the loaded position defines the magnitude of force a fish must exert on the fishing pole before actuating the device and further defines the instantaneous force exerted on the fish when the device is actuated. A trigger mount, engageable with the receiving tube and mounted to the base is provided for setting the device in the loaded position. Once loaded, when the receiving tube is pulled forward by sufficient force of a fish pulling on the line of the fishing pole inserted within the receiving tube, the trigger mount will disengage from the receiving tube allowing the receiving tube and the pole inserted therein to be drawn in the backwards direction, thereby setting the hook in the fish. Then the fisherman may remove the pole from the device and manipulate the pole to land the fish. Mounting eyelets may be included on the device for mounting the device to a boat. The device may be mounted to allow for trolling or stationary fishing from the boat. Additional features may include spikes hinged to the bottom of the device to allow the device to be securely anchored in the ground for use along shorelines. Also, a warning apparatus may be included on the device and positioned relative to the receiving tube such that when the device is tripped from the loaded position, a warning signal is generated, thereby signaling the fisherman that the device has been actuated.

An advantage of the present invention is that it allows for predetermined setting of the spring tension in the loaded position and thus the force necessary to trigger the device, thereby allowing the user to preset the device in accordance with the breed and minimum size of fish being sought.

Another advantage of the invention is that the automatic fishing device is not connected directly to the fishing line thereby avoiding abrupt forces of the device from being applied directly to the line.

Another advantage of the automatic fishing device is that the force applied after the device is triggered is variable according to the force necessary to trigger the device in the first instance. This feature has the inherent advantage of not employing such a strong force that the fish hook will be extracted from the fish when the fishing pole is pulled backwards by the device.

The foregoing and other objects, features and advantages of the invention will be apparent from the following description of the preferred embodiment of the invention as illustrated in the accompanying drawings.

IN THE DRAWING

FIG. 1 is a side elevational view showing an automatic fishing device of the present invention in a loaded position and, in phantom, in an unloaded position;

FIG. 2 is a plan view of the automatic fishing device of FIG. 1 in the unloaded position;

FIG. 3 is a cross-sectional front elevational view taken along the line 3—3 of FIG. 2 of the adjustable spring mount of the fishing device;

FIG. 4 is a cross-sectional side elevational view taken along the line 4—4 of FIG. 2 illustrating the adjustable spring mount;

FIG. 5 is a cross-sectional side elevational view taken along the line 5—5 of FIG. 2 illustrating the trigger mount;

FIG. 6 is a cross-sectional view taken along the line 6—6 of FIG. 1 of an embodiment of a shock mount and a switch for initiating a warning signal;

FIG. 7 is a perspective view of a portion of the receiving tube illustrating the pole receiving channel; and FIG. 8 is a side elevational view of a portion of an additional embodiment of the base of the automatic fishing apparatus of the present invention showing the additional feature of a ground spike hinged to the bottom of the base.

DETAILED DESCRIPTION OF THE PREFERRED EMBODIMENT

FIGS. 1 and 2 are respectively a side elevational view and a plan view of an automatic fishing device, referred to by the general reference character 10, of the present invention. In FIG. 1 the device is illustrated in the "loaded" position and in an "unloaded" position (in phantom). The automatic fishing device 10 is comprised of a base 11 having a U-shaped cross-section to form a groove with a bottom wall 12 and a pair of vertically projecting lateral walls 13 (see FIG. 3). A receiving tube 14 is pivotally mounted thereto. An adjustable spring mount 16 and a trigger mount 18 are engaged to the base 11. A spring 20 is connected between the receiving tube 14 and the adjustable spring mount 16. A spring connector 22 interconnects the spring 20 with the tube 14 at an elevation near the top end of the back side of the tube 14. The spring connector 22 is in the form of an eyelet to permit the end of the spring 20 to pivot relative to the tube 14 about the interconnect point. A trigger eyelet 24 is located near the bottom portion of the front side of the receiving tube 14. As hereinafter further described, the eyelet 24 is adapted for coacting with the trigger mount 18 to hold the receiving tube 14 in the loaded position against the tension of spring 20. A pivot pin 26 extends from side to side of the base 11, through the side walls 13 and through the tube 14. The pin 26 thus defines the pivotal point of the receiving tube 14 relative to the base 11. A shock mount 28 incorporating a shock absorber 30 is connected to the base 11 adjacent to the pivot pin 26 and tube 14 for decelerating and stopping the backward motion of receiving tube 14 whenever the trigger mount 18 is disengaged to release the receiving tube 14 from the loaded position.

The base 11 further includes a first pair of boat eyelets 36 and 38 on one side and a second pair of boat eyelets 40 and 42 on the other side for securing the device 10 to a boat (not shown).

As further illustrated in FIGS. 3 and 4, the adjustable spring mount 16 includes a U-shaped rail having a bottom wall 46 and a pair of side walls 48 and 49. Adjacent the top edge of the wall 49 is a groove 50 and adjacent the top edge of the wall 50 is a groove 51. A flat rectangular-shaped carriage 52 is positioned in the grooves 50 and 51 such that it may be slid longitudinally along the walls 48 and 49 of the rail relative to the pivot pin 26. The grooves 50 and 51 in the side walls 48 and 49 extend the length of the rail to allow the carriage 52 to be slidably moved to any desired position along the rail 49. The carriage 52 carries a connector eyelet 54 to engage the end of the spring 20 such that the end of the spring 20 moves responsive to movement of the carriage 52.

A carriage lock 56 is coupled with the carriage 52 to provide for locking the carriage in place along the rail side walls 48 and 49. The carriage lock 56 is located intermediate the spring connector 54 and the end of the carriage 52 most remote from the receiving housing 14. Thus, one end of the spring 20 is connected to the spring connector 54 so as to anchor that end of the spring on the adjustable spring mount 16 while the other end of the spring is anchored to the receiving tube 14 as previously described. The carriage lock 56 is in the form of a threaded bolt extending through a threaded hole 57 in the carriage 52 with the end of the bolt bottoming out on the bottom side wall 46. When the carriage lock 56 is tightened with the end of the bolt 56 in contact with the wall 46, the carriage 52 exerts a force on the top side of the grooves 50 and 51. This holds the carriage 52 in a fixed position. A pointer 58 extends laterally from the carriage 52 over an index 60 marked on the top side of the rail wall of the adjustable spring mount 16 (see FIGS. 1 and 3). This provides a scale indicator for the degree of tension on the tube 14 when in a select loaded position.

The trigger mount 18, as best illustrated in FIGS. 1, 2 and 5 has a pivot pin 61 passing through a U-shaped trigger housing 62 formed by a bottom wall 63 and a pair of vertically projecting side walls 64. An L-shaped trigger hook 65 is engaged at one end to the pin 61 such that the hook is pivotable about the pin. A trigger bias spring 68 is engaged to the hook 65 to continuously bias the hook towards the bottom wall 12 of the housing base 11. One end of the spring 68 is fixed to the barrel of the hook 65, and the other end of the spring is fixed to the pin 61 so as to continuously urge the trigger hook 65 to a position withdrawn from engagement with the eyelet 24 of the receiving tube 14. An O-shaped shock absorber 66 is mounted about the barrel of the trigger hook 65 to prevent damage to the hook when it is pulled away from engagement with the eyelet 24 during a disengagement operation.

When in the unloaded position, the automatic fishing device 10 assumes a position as illustrated by the phantom lines in FIG. 1. In this position, the trigger hook 65 is disengaged from the eyelet 24 and the spring 20 urges the tube 14 in abutting relationship to the shock mount 28. When it is desired to load the device, the carriage lock 56 is released and the carriage 52 moved to a desired position as indicated by the pointer 58 and indicia 60. The movement of carriage 52 and adjustable spring mount 16 allows the spring 20 to be preloaded with varying degrees of tension. The further away spring connector 54 on the adjustable spring mount 16 is from the pivot point as defined by the pivot pin 26 in the base 11, the greater the preload tension of the spring 20. When the carriage 52 is positioned to the desired position, the lock 56 is locked in place. During the setting of the carriage 52, the receiving tube 14 is supported in the unloaded static position by means of the shock mount 28. Then, the receiving tube 14 is moved forward about the pivot pin 26 and the trigger hook 65 is inserted into the eyelet 24 (see FIG. 1). The trigger hook 65 is retained in the eyelet 24 due to the oppositely directed force exerted by the spring 20 on the receiving tube 14. It may be noted that when the receiving tube 14 is pulled forward slightly from the loaded position, the trigger hook 14 is immediately forced downward and out of engagement with the eyelet 24 due to the force of the spring 68.

The indicia of the pointer 58 on the indexed rail 60 can indicate the number of pounds of force necessary to cause the device to be triggered. The scale on the index 60 may be in pounds and/or the type of fish that is capable of exerting such a pressure. Indicia 60 is provided as an aid to the inexperienced user of the device and to assist in establishing a proper setting of adjustable spring mount 18.

The tension on the spring 20, when in the loaded position is determinative of the amount of force necessary to be applied to the receiving tube 14 to release the trigger hook 65. The spring 20 may be selected so as to have a linear spring constant, i.e., so many pounds of force for each increment of extension. For example, if the spring 20 has a spring constant of five pounds per inch and the carriage 52 on the adjustable spring mount 18 can vary the extension of the spring 20 between a quarter of an inch to six inches, the sensitivity range of the automatic fishing device 10 would be from 1.25 pounds to thirty pounds. The setting of the spring 20 also will affect the amount of backward force applied to the receiving tube 14 when the trigger hook 64 is disengaged from the eyelet 24. The greater the extension of the spring 20, the greater the force that will be applied to the receiving tube 14 for drawing the receiving tube 14 in a backwards direction after the hook 65 disengages from the eyelet 24. The mass of the receiving tube 14 and fishing rod inserted within the receiving tube 14 can be considered to be the mass that must be moved by the spring 20 about the pivot 26 when receiving tube 14 is disengaged. Therefore, the speed with which the tube 14 and the fishing rod will be moved backwards is dependent upon the extension of spring 20 before disengagement of trigger hook 65 from eyelet 24. In essence, the smaller the force necessary to trigger the automatic fishing device 10, the slower the acceleration and the smaller the backward force applied to the receiving tube 14 and to the fishing rod. In this manner, large forces and high acceleration will not be experienced when dealing with smaller varieties of fish so that the fish hook will not be extracted from the fish. On the other hand, when fishing for larger fish, higher accelerations and greater forces are available to insure proper hooking of the fish after the device has been triggered. Also, when fishing for larger fish, smaller fish will not be able to trigger the device. This is particularly important when live bait is engaged to the hook.

In use, once the device 10 is in the "loaded" position, the fisherman casts his line and the fishing rod or pole is inserted into the receiving tube 14. (Though it has been found more awkward to do so, the fishing pole or rod 14 may be inserted into receiving tube 14 when it is in the unloaded position and then the device 10 set in the loaded position with the fishing rod already inside the receiving tube 14.)

FIG. 6 shows a cross-sectional side elevational view of an additional feature that may be incorporated in the automatic fishing device 10. The additional feature is in the form of a signaling device to warn the fisherman that the device has been tripped. A microswitch 70 is mounted to the shock mount 28. The microswitch 70 contains a plunger 71. When the device is in the unloaded position, the plunger 71 is in contact with a pair of contacts 72 and 74, thereby closing the switch 70. A plug assembly 76 is provided whereby connection to a warning device, e.g., light, horn, etc., can be made to the switch 70. When the receiving tube 14 is in the loaded position, the microswitch 70 is open. Then, when the tube 14 is released by a fish pulling the pole and tube 14 forward, the tube swings backward and the microswitch is closed thereby activating the warning device.

FIG. 7 shows a perspective view of a further feature which may be embodied. Threaded holes 78 are provided within the top portion of the receiving tube 14 and turn bolts 80 are screwed therein. The end of the turn bolts 80 support pressure pads 82. The turn bolts 80 are screwed in and tightened so as to hold the fishing rod securely within the receiving tube 14. This is to insure that the fishing rod is not pulled from the receiving tube 14 due to some unexpected set of circumstances.

As illustrated, the device 10 may be mounted to a trolling boat. The spring tension may be set so that the force exerted by the tackle is not sufficient to trip the trigger. Then when a fish strikes, the additional force trips the device to set the hook in the fish. Also, the preset of the mount 16 may be such that only fish of sufficient size will cause tripping.

FIG. 8 is a partial side view of the base 11 having a hinge 90 connected to the bottom thereto for allowing the output movement of a spike 92. When the automatic fishing device 10 is used along a shoreline, the spike 92 may be projected downward (as illustrated in phantom) such that the automatic fishing device may be securely implanted into the earth, thereby preventing the automatic fishing device from moving and possibly causing a malfunction of the automatic fishing device.

While the invention has in particular shown and described in reference to the preferred embodiments thereof, it would be understood by those skilled in the art that various changes in form and detail may be made therein without departing from the spirit and scope of the invention.

What is claimed is:

1. An automatic fishing device comprising:
   a base;
   a receiving tube pivotally mounted to said base for receiving the handle portion of a fishing rod therein, said receiving tube having a first spring connector and a trigger connector;
   an adjustable spring mount engaged to said base, said adjustable spring mount including a track and a carriage assembly movably mounted within said track for lateral movement relative to the pivot of said receiving tube, said carriage assembly having a second spring connector and a locking means for locking said carriage assembly in place on said track at selected positions;
   a spring connected at one end to said first spring connector of said receiving tube and at the other end to said second spring connector of said carriage of said adjustable spring mount; and
   a trigger mount connected to said base for engaging said trigger connection of said receiving tube for holding said receiving tube in a loaded position opposing the force exerted by said spring.

2. An automatic fishing device as recited in claim 1 wherein said track includes:
   grooves projecting from said pivot for receiving said carriage assembly and allowing said carriage assembly to move along said grooves; and
   said locking means being adapted to lock said carriage to said adjustable spring mount at selected positions by forcing said carriage against a wall of said grooves in said track.

3. An automatic fishing device as recited within claim 1 wherein said trigger mount further comprises:
   a trigger hook pivotally mounted within said trigger mount for engaging said trigger connector on said receiving tube; and
   a trigger spring connected to said trigger hook and said trigger mount for biasing said trigger hook away from said trigger connector.

4. An automatic fishing device as recited in claim 2 wherein said trigger mount further comprises:
   a trigger hook pivotally mounted within said trigger mount for engaging said trigger connector on said receiving tube; and
   a trigger spring connected to said trigger hook and said trigger mount for biasing said trigger hook away from said trigger connector.

5. An automatic fishing device as recited in claim 1 further comprising:
   a switch connected to said base and positioned in the travel path of said receiving tube about said pivot such that said switch is activated when said receiving tube is released from said trigger mount.

6. An automatic fishing device as recited in claim 1 further comprising means engaged to said base for mounting said automatic fishing device to a boat.

7. An automatic fishing device as recited in claim 1 further comprising:
   a hinge connected to the bottom of said base; and
   a spike connected to said hinge for being extended substantially perpendicular to the bottom of said base when said hinge is open and to be parallel with said base when said hinge is closed.

8. An automatic fishing device as recited in claim 6 further comprising:
   a hinge connected to the bottom of said base; and
   a spike connected to said hinge for being extended substantially perpendicular to the bottom of said base when said hinge is open and to be parallel with said base when said hinge is closed.

9. An automatic fishing device as recited in claim 1 wherein said receiving tube further comprises:
   a fishing pole locking means for locking a fishing pole within said receiving tube, said locking means having a plurality of bolts extending through the walls of said receiving tube for applying holding pressure to a fishing pole inserted into said receiving tube.

10. An automatic fishing device as recited in claim 2 wherein said adjustable spring mount further comprises:
    a pointer connected to said carriage of said adjustable spring mount; and
    indicia recorded on one of said rails of said adjustable spring mounts, said pointer over lapping said indicia, said indicia indicating the force necessary to disengage said trigger hook of said trigger mount from said trigger connection of said receiving tube once said receiving tube is in a loaded position.

11. An automatic fishing device as recited in claim 1 wherein:
    said adjustable spring mount further comprises;
    grooves within said track projecting from said pivot for receiving said carriage and allowing said carriage to move along said grooves, a locking bolt threaded through said carriage for making contact with the bottom of said spring mount so as to effectively force said carriage against the top of said grooves when said locking bolt is tightened for effectively locking said carriage to said adjustable spring mount at any selected position within said adjustable spring mount, a pointer connected to said carriage of said adjustable spring mount, and indicia recorded on a rail forming a portion of said adjustable spring mount, said pointer overlapping said indicia, said indicia indicating the force necessary to disengage said trigger hook of said trigger mount from said trigger connection of said receiving tube when said receiving tube is in a loaded position;

said trigger mount further comprising;

a trigger hook pivotally mounted within said trigger mount for engaging said trigger connector on said receiving tube, and a trigger spring connected to said trigger hook and the bottom of said trigger mount for biasing said trigger hook away from said trigger connector;

a switch connected to said base and positioned in the travel path of said receiving tube about said pivot such that said switch is activated when said receiving tube is released from said trigger mount;

means engaged to said base for mounting said automatic fishing device to a boat;

a hinge connected to the bottom of said base;

a spike connected to said hinge for being extended substantially perpendicular to the bottom of said base when said hinge is open and to be parallel with said base when said hinge is closed; and a fishing pole locking means for locking said fishing pole within said receiving tube, said locking means having a plurality of bolts extending through the walls of said receiving tube for applying holding pressure to a fishing pole inserted into said receiving tube.

* * * * *